United States Patent
Zhang

(10) Patent No.: US 10,810,821 B2
(45) Date of Patent: Oct. 20, 2020

(54) SYSTEM AND METHOD FOR MDB DATA PROCESSING OF VENDING MACHINES

(71) Applicant: INHAND NETWORKS Inc., Fairfax, VA (US)

(72) Inventor: Jianliang Zhang, Beijing (CN)

( * ) Notice: Subject to any disclaimer, the term of this patent is extended or adjusted under 35 U.S.C. 154(b) by 0 days.

(21) Appl. No.: 16/468,865

(22) PCT Filed: Sep. 19, 2017

(86) PCT No.: PCT/US2017/052153
§ 371 (c)(1),
(2) Date: Jun. 12, 2019

(87) PCT Pub. No.: WO2019/059883
PCT Pub. Date: Mar. 28, 2019

(65) Prior Publication Data
US 2020/0258341 A1 Aug. 13, 2020

(51) Int. Cl.
*G07F 9/00* (2006.01)
*G06Q 20/18* (2012.01)

(52) U.S. Cl.
CPC ............. *G07F 9/006* (2013.01); *G06Q 20/18* (2013.01)

(58) Field of Classification Search
CPC .................................. G07F 9/006; G06Q 20/18
See application file for complete search history.

(56) References Cited

U.S. PATENT DOCUMENTS

| | | | | |
|---|---|---|---|---|
| 7,131,575 B1* | 11/2006 | Kolls | ...................... | G06Q 30/06 235/379 |
| 7,455,223 B1* | 11/2008 | Wilson | ................... | G06Q 20/18 221/9 |
| 7,693,602 B1* | 4/2010 | Kolls | ...................... | G07F 19/20 700/237 |
| 8,533,315 B2* | 9/2013 | Godwin | ................. | H04L 12/66 235/381 |
| 8,596,529 B1* | 12/2013 | Kolls | ...................... | G06Q 30/06 235/380 |
| 8,631,093 B2* | 1/2014 | Defosse | .................. | G07F 9/002 709/219 |
| 9,111,268 B2* | 8/2015 | Blachman | ............. | G06Q 20/20 |
| 9,547,950 B2* | 1/2017 | Osborne | ............... | G06F 16/273 |
| 9,830,764 B1* | 11/2017 | Murphy | ................. | G07F 17/18 |
| 10,163,292 B1* | 12/2018 | Romero | ............... | G06Q 20/322 |
| 2006/0183422 A1* | 8/2006 | Defosse | .................. | H04B 5/02 455/41.1 |
| 2007/0095901 A1* | 5/2007 | Illingworth | ............ | G06Q 20/18 235/381 |

(Continued)

OTHER PUBLICATIONS

W. Zhang and X. L. Zhang, "Design and Implementation of Automatic Vending Machine Based on the Short Massage Payment," 2010 6th International Conference on Wireless Communications Networking and Mobile Computing (WiCOM), Chengdu, 2010, pp. 1-4, doi: 10.1109/WICOM.2010.5600192. (Year: 2010).*

(Continued)

*Primary Examiner* — Ashford S Hayles
(74) *Attorney, Agent, or Firm* — John Ye

(57) ABSTRACT

The present disclosure relates to the field of vending machine technology. In particular, it involves a control system and control method implementing data processing under multidrop bus (MDB) protocol.

6 Claims, 3 Drawing Sheets

(56) References Cited

U.S. PATENT DOCUMENTS

| | | | | | |
|---|---|---|---|---|---|
| 2009/0306817 | A1* | 12/2009 | Antao | ................... | G07F 9/02 |
| | | | | | 700/231 |
| 2009/0306818 | A1* | 12/2009 | Slagley | ................... | G07F 9/002 |
| | | | | | 700/232 |
| 2009/0306819 | A1* | 12/2009 | Insolia | ................... | G07F 9/002 |
| | | | | | 700/232 |
| 2010/0094458 | A1* | 4/2010 | Sagady | ................... | G07F 9/026 |
| | | | | | 700/244 |
| 2011/0172814 | A1* | 7/2011 | Breitenbach | ........... | B67D 7/145 |
| | | | | | 700/232 |
| 2013/0013107 | A1* | 1/2013 | Felique | ................... | G07F 9/006 |
| | | | | | 700/244 |
| 2013/0331985 | A1* | 12/2013 | Felique | ................... | G07F 9/026 |
| | | | | | 700/244 |
| 2015/0100152 | A1* | 4/2015 | Barragan Trevino | ................... | |
| | | | | | G06Q 20/322 |
| | | | | | 700/232 |
| 2015/0235202 | A1* | 8/2015 | Zabala | ................ | G06Q 20/327 |
| | | | | | 700/232 |

OTHER PUBLICATIONS

V. P. Semenov, V. V. Chernokulsky and N. V. Razmochaeva, "The cashless payment device for vending machines—Import substitution in the sphere of vending," 2017 International Conference Quality Management,Transport and Information Security, Information Technologies,St. Petersburg, 2017, pp. 798-801, (Year: 2017).*
www.alibaba.com/mdb-usbcashlesspaymentadapter (Year: 2017).*
www.cnkiosk.aliexpress.com (Year: 2017).*
www.nayax.com (Year: 2017).*

* cited by examiner

SYSTEM AND METHOD FOR MDB DATA PROCESSING OF VENDING MACHINES

BACKGROUND OF THE DISCLOSURE

The present application is a national stage of PCT/US2017/052153, filed on Sep. 19, 2017, with its specification incorporated by reference, but otherwise the same. The disclosure below will assume common knowledge of multidrop bus (MDB) commonly found in vending machines.

In commercial vending machine architecture, a common cash accepting component of the vending machine is comprised of vending control and bill/coin acceptors. They are communicating through standard MDB/Internal Communication Protocol (ICP). Even though MDB/ICP standard can support master to multi-slave device communication, older vending machines did not consider more components for additional payment options. Therefore, preexisting vending machines are difficult to be reconfigured or upgraded. In addition, for supporting central cloud management platform, there needs to be an aggregation function of all payments (mobile payment and cash payment). Based on the mater/slave architecture in MDB/ICP, it is not possible for cloud management to communicate with the slave device directly (such as bill/coin acceptor). Commercial MDB/ICP-232 replacement is based on simulating MDB/Vending Machine Controller (VMC) timing control to communicate with bill/coin acceptor, but it does not offer communication with the master device through MDB/ICP standard. Therefore, this replacement cannot be used directly to upgrade existing older vending machines.

As discussed in US2013/0013107 A1, current technology can only be replaced as a whole by VMC board. But this method comes with high cost and complexity.

SUMMARY OF THE DISCLOSURE

Based on the above deficiencies, an objective of the disclosure is to provide a new processing system (adapter) that will interface with MDB to provide upgrade options. This adaptor system includes main processing unit, database unit, first MDB connector, second MDB connector and external interface.

The database unit stores the commands applicable to be retrieved and executed in the master control unit. The said adaptor system is configured to:

when receiving from the first MDB connector transmitted data from the vending machine's VMC, store the data sequentially into buffer, and determine whether the data in the buffer requires to be modified by following a predetermined data processing procedure, and when the data is required to be modified, then modifying it before forwarding it to the second MDB connector;

after the vending machine VMC data has been received, determine whether the data is for a second card reader, if is, then have the main processing unit collect and report the second card reader data over an Internet payment management interface, and after such reporting, return back to the first MDB connector step; if the data is not for the second card reader, then the data needs to be translated and forwarding to the external interface for processing;

similarly, when receiving from the second MDB connector transmitted data from slave devices, store the data sequentially into buffer, and determine whether the data in the buffer requires to be modified by following a predetermined data processing procedure, and when the data is required to be modified, then modifying it before forwarding it to the second MDB connector; and after forwarding, further determine the MDB slave device type, then have the main processing unit translate the data based on the device type, and forward the translated data to the external interface.

The aforementioned predetermined data processing procedure is based on data characteristics and processing functionality. It also takes into consideration of the VMC data characteristics and external data processing characteristics, in formulating the corresponding data processing functionality.

The database unit can store for external data processing procedure the data from coin acceptor, bill acceptor and POS data.

DETAILED DESCRIPTION OF THE DISCLOSURE

Embodiment

Figure 1:
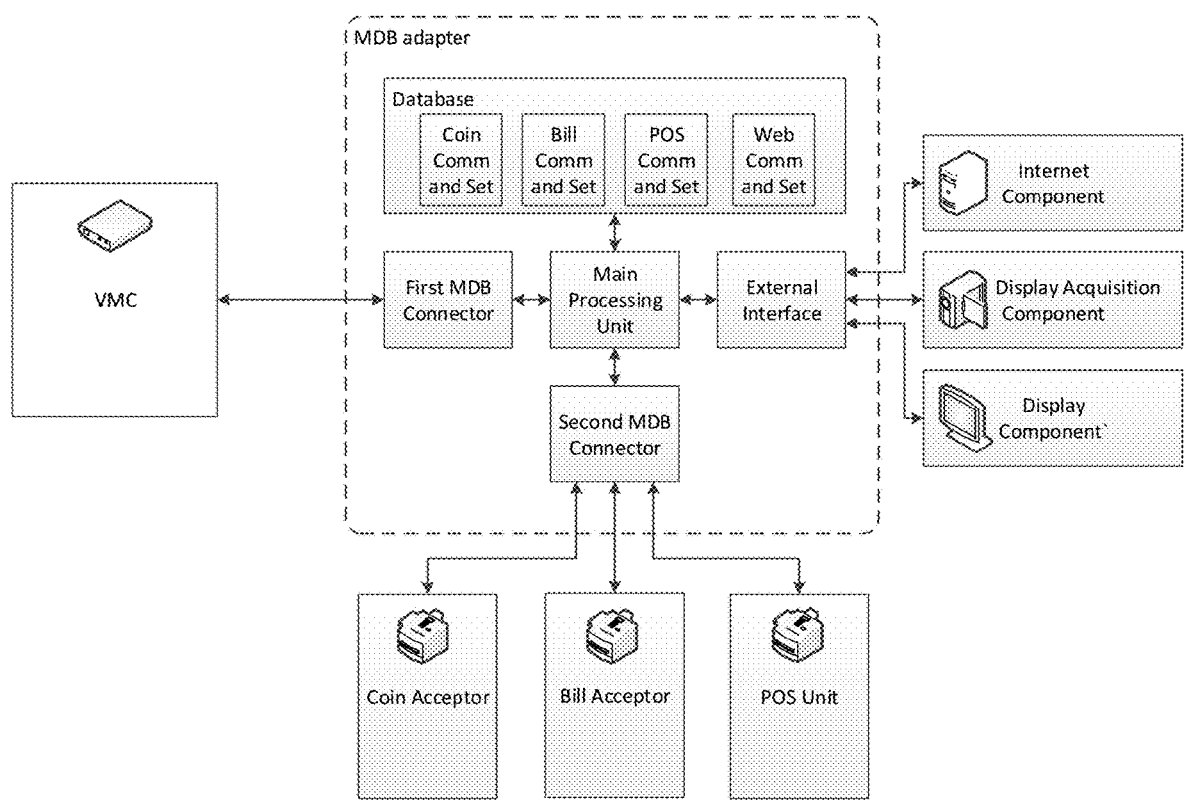
FIG. 1 shows a MDB adaptor and data processing of this disclosure.

The following embodiment should be read together with the drawing to provide context and details. But one should note that the following embodiment should not be read in isolation in terms of the described characteristics or technical combination. One can rearrange the technical combination in order to achieve better results. When the following embodiment refers to a similar identification of a component or characteristic, they are equally applicable in other embodiments.

FIG. 1 depicts the embodiment's design suitable for existing MDB data processing. It is comprised of main processing unit, database unit, first MDB connector, second MDB connector and external interface. The main processing unit is for MDB data processing. The database unit is for storing commands for processing data. The first MDB connector interfaces with VMC, and for facilitating the data communication with the vending machine. The second MDB connector is for communicating with MDB slave components such as coin acceptor and bill acceptor, in order to connect them with the VMC vending machine. The external interface is for extending MDB components with external processing units, such as Internet communication unit, display unit, input unit and non-cash acceptor unit.

There are two main MDB data processing components in this embodiment.

The first is for MDB data processing with VMC. The second is for processing MDB data with external MDB enhancement units.

Figure 2:
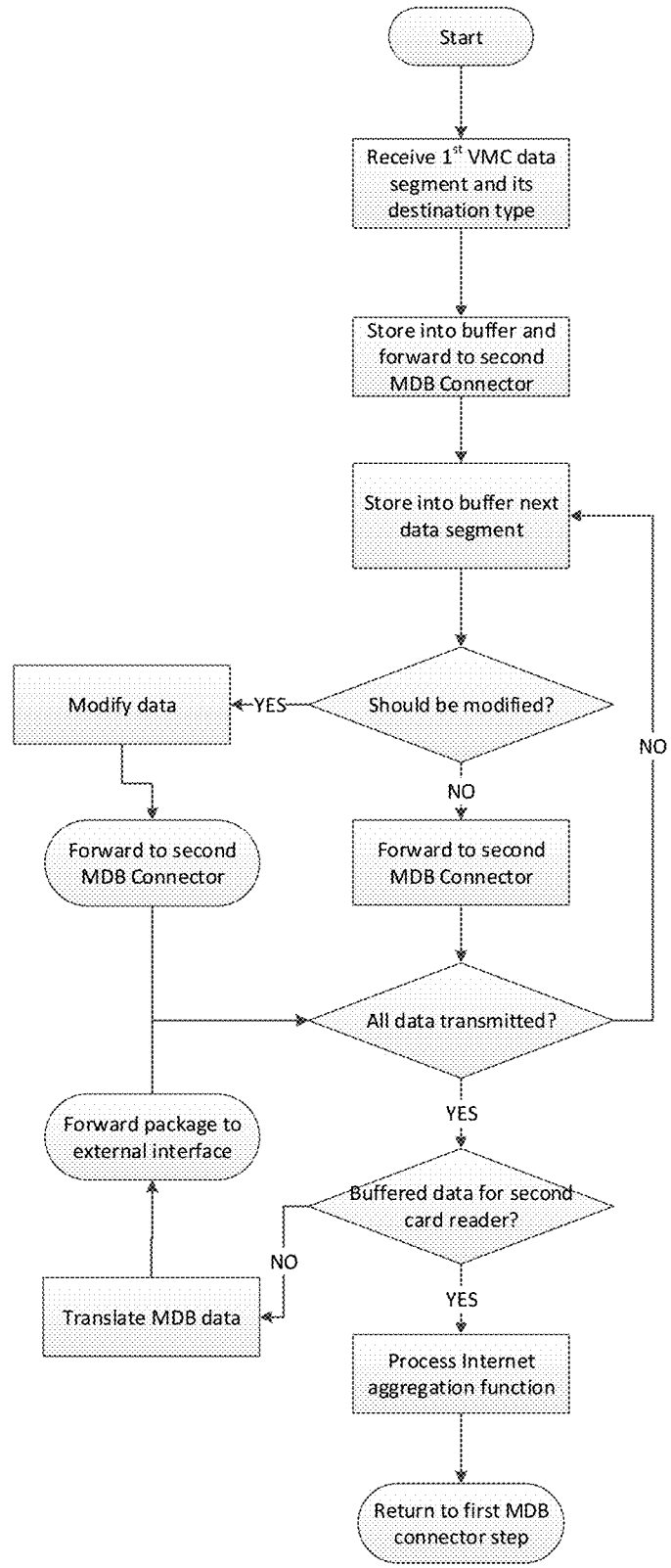
FIG. 2 shows a flowchart of the VMC data processing of this disclosure.

First, as shown in FIG. 2, particularly regarding the MDB data processing with VMC, when VMC data is received, the processing procedure picks up from the MDB protocol first segment that contains the destination MDB unit identification. This destination identifier is recorded. The main process unit then stores the first segment data into the database unit, and forwards this first segment to the second MDB connector.

Based on the MDB standard, a vending machine can support two card readers. In this embodiment, when interacting with MDB components, one can preserve the first card reader for POS unit, but reserve the second card reader as virtual POS. This virtual POS' MDB address is 0x60. This virtual POS is then used for Internet data communication and facilitate Internet payment as POS payment back to VMS.

To guarantee VMC data timing integrity, the main processing unit should forward the first segment of VMC data to the second MDB connector in real time. Thereafter, with the first segment of VMC data unit is stored in buffer, the subsequent segments are received sequentially into buffer to be processed by the predetermined processing procedure. The processing procedure will determine whether each segment data in the buffer needs to be modified. If required modification, the data is replaced by the modified data, and then forwarded to the second MDB connector. If not, the processing procedure continues onto the next segment until all segments are processed.

The aforementioned predetermined processing procedure is based on data characteristics and processing functionality. First, the different VMC data types are modeled before processing. The data type of this embodiment is applicable but not limited to VMC generated coin return or bill return, digital coupon netted cash requirement, return cash modification and modified card reader payment. As for the above VMC data types, the predetermined processing procedure provides a set of corresponding data replacement instructions.

After all the data in the buffer has been processed, the next step is to determine if the data is intended to be the second card reader (virtual POS). If that is the case, then the main processing unit will process this data in accordance with the Internet payment aggregation processing instructions, and return the processed data back to the first MDB connector. If not, the main processing unit then translates the data into external processing data and forward it to the external interface.

The discussed Internet payment aggregation processing instructions can support multiple payment methods, like smart payment, coupon payment or prepaid. For example, when customers are using display terminals that support barcode or 2-D barcode, they can confirm and make payments on their mobile device. And after the main process unit receives confirmation over the Internet that the payment has been received, it translates such confirmation into a MDB second reader generated payment, and forwards it to the VMC.

When customer selects from the touchscreen display the option to pick-up merchandise, and enters the order number into the vending application, the main processing unit forwards this order and pick-up information to the remote processing server for verification. When verification is processed, an acknowledgement is returned to the main processing unit. The acknowledgement information contains whether the order and pick-up information is valid, and if valid, the merchandise numbers used by the vending machine. When the main processing unit is satisfied with the user input and the verification, it will convert the pick-up task information into a transaction package that also includes payment set for second card reader. Thereafter, the main processing unit forwards this package to VMC and inform VMC the payment has been made.

When the buffer data is not intended for the second card reader, it means there is a more complex transaction. Here, the main process unit will translate the buffer data into its intended format, and forward it to the external interface. The translated data can be transmitted through the external interface to a display component, where it will be displayed as transaction procedure, so that customers can control their purchase tasks. The external interface is also a gateway for collecting customers purchase behaviors for a wider management network.

Figure 3:
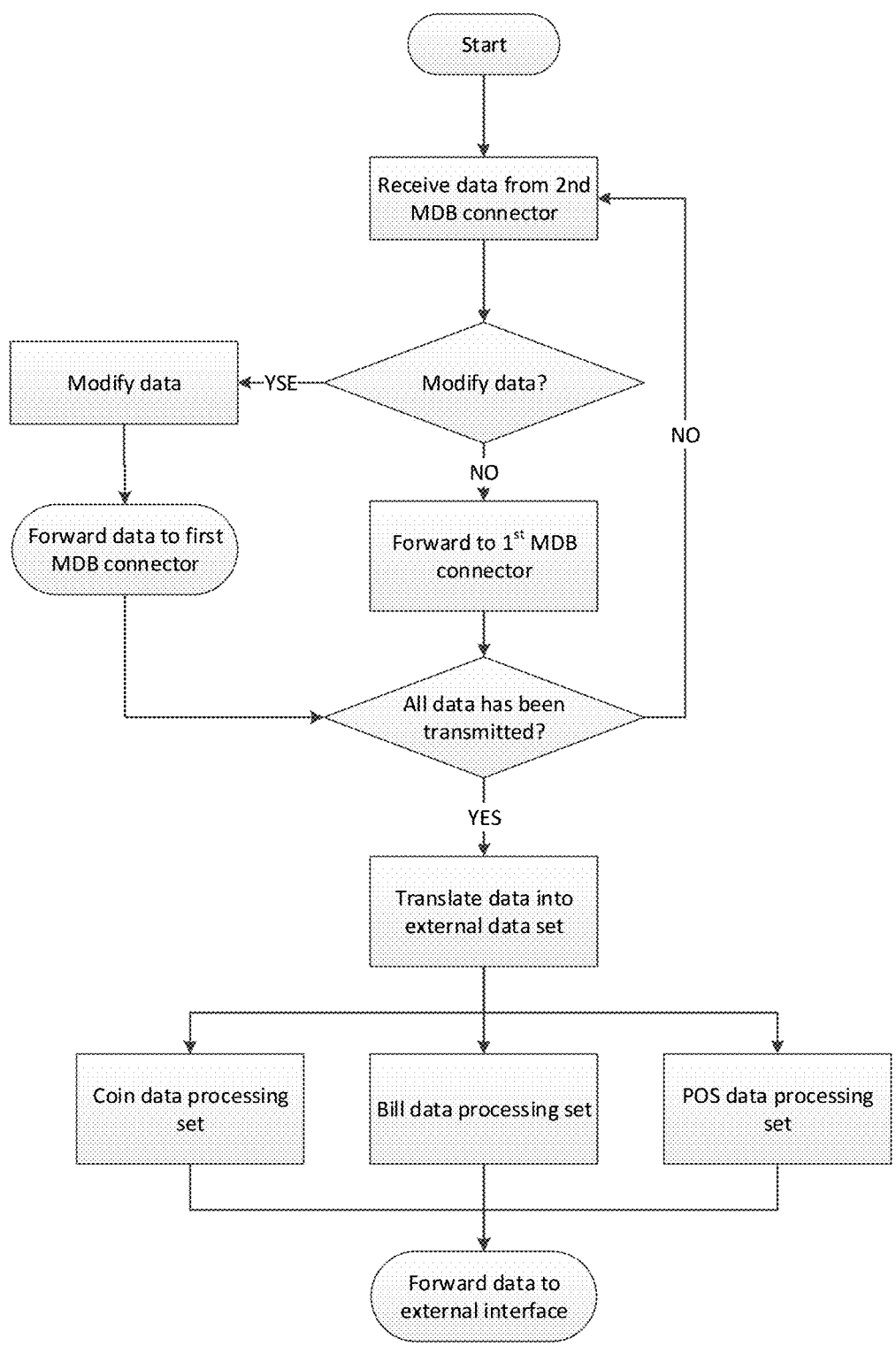
FIG. 3 shows a flowchart of the MDB data processing that can be interfaced externally.

As indicated in FIG. 3, the flowchart is directed to the communication of the adaptor and other MDB slave devices. When the main processing unit receives from the second MDB connector the data transmitted by other MDB slave devices, it will cache the data into the buffer. When processing the buffer data segment by segment, it will determine whether the segment data needs to be modified. If there is a need to modify the data, then the main process unit will utilize the predetermined processing procedure to replace the buffer data. On the other hand, if there is no modification needed, then it will forward the data to the first MDB connector. The process will continue until all the data has been transmitted to VMC.

After all the data from the second MDB connector has been transmitted to the VMC, the next step is to do external aggregation function for the different data sets. This embodiment works with external data sets for coin data, bill data and POS data. After translating the buffer data into the external data set, the external data set is forwarded to the external interface. This external interface can communicate the transaction data to a display device, where customers can review the transaction information such as payment amount. Further, the external interface can communicate over the Internet to report to remote database then sales and merchandising information.

In conclusion, the adaptor embodiment represents reengineering vending machine design by way of utilizing the second card reader as an upgrade entry point. This upgrade method achieves the smart payment vending needs by facilitating multiple non-cash payment options on existing legacy vending machines. The embodiment disclosed is only for teaching of the basis functionalities on how such adaptor can work. A person ordinary skilled in the art should be able to implement and expand the teaching regarding the adaptor. But in any case, this disclosure is only for demonstration purpose and should not be construed as the limitation of the claims.

The invention claimed is:

1. A vending machine MDB data processing system comprises:
   a main processing unit,
   a database unit,
   a first MDB connector,
   a second MDB connector and
   an external interface, wherein MDB is a NAMA (National Automatic Merchandising Association) standard in a single-master, multiple-slave configuration using an MDB protocol;
   the system is configured to receive data from either the first MDB connector or the second MDB connector;
   the data is first processed by the main processing unit before being sent to it's-a destination;
   wherein after the data is received from the first MDB connector, store this data into database unit;
   first segment of the data is processed to obtain destination type;
   wherein the data received from the first MDB connector is processed
   to determine whether the data should be modified, and if the data needs to be modified, then that data is replaced according to predetermined set of process procedure, before that data is forwarded to the second MDB connector;

wherein after the data received from the first MDB connector has been processed, the system is configured to determine whether the data is intended for the system's own consumption, if yes, then perform aggregation function for payment management; if not, then translate the data into external package and send for the external interface.

2. The MDB data processing system according to claim 1 wherein additional external components are attached to the external interface, comprised of Internet component, display acquisition component, and display component.

3. The MDB data processing system according to claim 2 wherein after the data is received from the second MDB connector, store this data into database unit;

the data received from the second MDB connector is processed in a way that determination of whether the data should be modified, and if the data needs to be modified, then that data is replaced according to the predetermined set of process procedure, before that data is forwarded to the first MDB connector.

4. The MDB data processing system according to claim 3 wherein after the data received from the second MDB connector has been processed, the system is configured to do aggregation function for remote management.

5. The MDB data processing system according to claim 4, wherein any data processed by the system can be displayed as customer transaction.

6. The MDB data processing system according to claim 5, wherein the system is configured to work as a virtual card reader conforming to the MDB protocol.

* * * * *